Patented Feb. 1, 1944

2,340,585

UNITED STATES PATENT OFFICE 2,340,585

ACID TREATING OF DISTILLATES

Bruce W. Dunbar, Compton, Calif., assignor to Shell Development Company, San Francisco, Calif., a corporation of Delaware No Drawing. Application February 10, 1942, Serial No. 430,305

8 Claims. (Cl. 196—38)

This invention relates to an improvement in the treatment of hydrocarbon distillates, especially cracked petroleum distillates, with sulfuric acid. More particularly, it is concerned with overcoming difficulties due to the formation of emulsions which are encountered when hydrocarbon distillates are refined with sulfuric acid, especially spent alkylation acids.

It is common practice to subject hydrocarbon oils and especially cracked hydrocarbon distillates to treatment with sulfuric acid during refining, to decrease their tendency to decolorize and to form sludge, etc., and to remove certain other undesirable substances. It is also common knowledge that the later stages in such treatments usually embrace water washing and/or neutralization of the acid-contacted oil, to render the final treated distillate as nearly neutral as possible.

It is also known in acid refining to substitute for fresh acid certain partially spent acids, thereby often effecting substantial economies in refinery operations. For example, it has been suggested that spent alkylation acid resulting from the use of a strong sulfuric acid (98%–100%) as a catalyst in the well known alkylation process, diluted to proper strength, might be employed.

Experience has shown that in the treatment there is a tendency to form quite stable emulsions with aqueous neutralizing solutions which are particularly stubborn when using spent alkylation acid. Upon analysis, the agent responsible was found to be a soap of one or more relatively unstable high molecular weight organic acids containing sulfur, which is formed by sulfonation and/or oxidation in the treating process, and in the case of alkylation acid may be present from the start. This difficulty has been obviated, however, by carrying out the neutralization in a carefully controlled manner. Thus the formation of such emulsions may be avoided by contacting the acid treated distillate with a neutralizing solution containing a base in a relatively high concentration, e. g., two or more equivalents per liter. It is also desirable that at least a stoichiometric quantity of the neutralizing agent be employed.

Even though emulsions are avoided in the neutralization step, as indicated above, additional troubles are encountered in handling the spent neutralizing solution, very stable emulsions being formed again when it becomes mixed with water and oil. Thus a disposal problem arises, for if any of such solution is allowed to drain to the refinery effluents, a curdy material, probably the previously mentioned soap, is liberated on contact with other waters. Thus curdy material causes considerable difficulty by forming thick viscous "globs" of emulsion with the small amounts of oil normally present in the drainage system. Its principal harmful effect is to cause oil in the form of emulsion to pass through the refinery oil separation system.

It is therefore the object of this invention to improve the sulfuric acid refining of hydrocarbon distillates, particularly where at least a portion of the refining agent is a spent alkylation acid.

It is a further object to carry out such a refining process free of emulsion difficulties.

A still further object is to prevent emulsions when the acid-contacted hydrocarbon distillates are neutralized, and at the same time, to obviate the difficulties which may arise in the disposal of waste neutralizing agent.

I have discovered that when alkylation acid-contacted distillates are neutralized under conditions to avoid the formation of emulsions, that is, when they are neutralized with a stoichiometric or larger quaitity of a neutralizing agent containing a relatively high concentration of base, e. g., two or more equivalents per liter, the emulsifying material is transferred completely to the aqueous phase, and that difficulties encountered in the disposal of the resulting spent solution may be avoided if the emulsifying material is first removed from the aqueous phase prior to its disposal.

Accordingly, in carrying out my invention, a hydrocarbon distillate containing undesirable components removable by sulfuric acid treatment is contacted with an acid refining agent, such as spent alkylation acid, to form a sludge and a treated distillate; the treated distillate is separated from said sludge, and is contacted with a solution of a water-soluble base under conditions such that any emulsifying material is transferred completely to the aqueous phase; the contacted distillate is then separated from the neutralizing solution, and the latter is subjected to a treatment to remove the emulsifier from the aqueous phase.

Suitable methods of applying the acid to the stock to be treated include the direct mixing in batch agitators, or continuous mixers, and settling the resulting sludge in the agitator or in separate settlers, and mixing the acid with suitable mechanical mixers and them removing the sludge by settling, centrifuge, etc. The amount of acid used may vary within conventional limits depending on the nature of the oil treated. Though very strong acid treats are somewhat more conducive to the formation of emulsions upon neutralization of the treated distillate, no more than a very slight increase in settling time will normally be occasioned.

The substantially complete removal of sludge is of great importance, since its presence is demonstrably responsible for a high emulsification tendency. This high emulsification tendency may be the result of relatively large concentrations of emulsifying agent contained in the sludge or of the additional volume of neutralizing solution required. Particular care should be exercised when very strong acid treats are employed, since under such conditions the carry-over of sludge is somewhat harder to control.

Neutralization is accomplished by intimately contacting the separated distillate and neutralizing solution in a mixer followed by a settling period to separate the spent neutralizing solution.

Suitable neutralizing agents include water-soluble bases such as the hydroxides and carbonates of Li, Na, K, Rb, and Cs. For obvious economic reasons, it is the general practice to employ sodium hydroxide or carbonate.

When the concentration of the neutralizing solution used is two normal or greater, very little emulsion is formed, and therefore the spent neutralizing solution may be easily separated from the neutralized distillate.

Care should be exercised to avoid variations in the neutralizing procedure, the effect of which is to reduce the relatively high concentration of base. Thus water washes prior to neutralizing employing substantial amounts of water (e. g. greater than about 0.5% volume) result in the formation of very stable emulsions. Also the introduction of wash water, either into the neutralizing solution or into the oil after neutralizing but before settling accentuates emulsion formation if the resultant diluted neutralizing solution has an equivalent concentration of less than 2 normal. This action is apparently related to the solubility characteristics of the organic emulsifying material, dilution causing hydration or hydrolysis or both, resulting in an accumulation of the soap at the oil water interface.

Following neutralization, the distillate is separated, and the resulting spent neutralizing solution is then subjected to a treatment to remove the emulsifying material from the aqueous phase. Suitable treatments for its removal include: (1) "salting out" by the inorganic compounds commonly used for this purpose, e. g. sodium or potassium chlorides or sulfates, etc., to remove the emulsifying material as an easily removable curd, which is settled, filtered, etc.; (2) precipitation of the emulsifier as a salt of calcium, barium, copper, iron, etc., and its removal from the spent solution as such precipitate; (3) diluting the spent solution with an amount of water so as to produce a diluted solution containing between .25 and 2 equivalents and preferably between .5 and 1 equivalent per liter of combined alkali metal, whereby the soap is thrown out of solution in hydrated form and accumulates at the top of the aqueous liquid, whence it is easily skimmed and removed; (4) diluting the spent solution in a manner similar to that outlined in (3), emulsifying with several volume per cent, e. g. 1%–5% of a middle oil such as gas oil, kerosene, etc., and heating the resulting emulsion to a temperature above about 140° F. but below its boiling temperature, preferably 160° F.–180° F., thereby transferring it to a relatively small volume of oil, and removing the oil together with the emulsifying material. The application of heat causes the emulsion to break rapidly.

Of the methods enumerated above, (4) has been found to be the most suitable in practice. Spent neutralizing solution after this treatment is substantially free of organic matter and completely compatible with the normal refinery drainage. The "oil-emulsifier" solution accumulated can be disposed of as fuel in boiler houses, or by other means where the strong emulsifying properties would cause no difficulties.

The following example will serve to illustrate the effectiveness of my process.

*Example*

A series of treating operations were carried out at a refinery acid treating unit, with the following results.

Dubbs cracked gasoline having a boiling range of about 300° F. to 400° F. was contacted at an average throughput of about 12,500 bbls. per day with an 86% solution of a spent alkylation acid. The resultant sludge was separated, and the treated distillate was then contacted with 11° to 12° Bé. solution of sodium carbonate. Under such conditions very stubborn oil-in-water emulsions were formed in the neutralization tank.

The strength of the solution was increased to 14° Bé., corresponding to about 2 normal $Na_2CO_3$, with great lessening of emulsification difficulties in the neutralization tank.

At the same time, however, increased difficulties were encountered when the spent neutralizing solutions were disposed to the refinery effluents, viscous blobs of emulsion accumulating when these solutions became mixed with the small amounts of oil in the drainage system.

The following treating procedure was then employed with resultant emulsion-free operation throughout: Dubbs cracked gasoline was acid treated as explained above. The neutralization of the treated distillate was then carried out employing an approximately 2 normal aqueous solution of sodium carbonate. Before disposal to the refinery effluents the spent solution was diluted with from one to two parts of water per part of solution, and a small volume of a middle oil was added to act as a collecting agent for the emulsifying material. The resulting emulsion was heated to a temperature of between 160° F. and 180° F., the emulsifying material being transferred thereby to the relatively small volume of oil. The oil, together with the emulsifying material, was removed, and the spent solution was then disposed of to the refinery effluents, where it now caused no emulsion difficulties.

I claim as my invention:

1. In a process for treating a spent neutralizing solution employed in a process for refining hydrocarbon distillates wherein a hydrocarbon distillate is contacted with sulfuric acid to form a sludge and a treated distillate containing small amounts of oil-soluble emulsifying material, said distillate is separated from said sludge, the separated distillate is contacted with an aqueous solution of a water-soluble base of an alkali metal containing at least two equivalents per liter of said alkali metal under conditions such that said emulsifying material is dissolved in the aqueous phase and the contacted distillate and resulting spent neutralizing solution are separated from each other, the improvement comprising diluting said solution with water to a content of said alkali metal equal to from .25 to 2 equivalents per liter, whereby said emulsifying material is changed into a compound insoluble in the aqueous phase and separating said insoluble compound formed from the remaining aqueous phase.

2. The process of claim 1 wherein said separated distillate is contacted with at least a stoichiometric quantity of said neutralizing solution.

3. The process of claim 1 wherein at least a portion of said acid is a spent alkylation acid.

4. The process of claim 1 wherein said water-soluble base is sodium hydroxide.

5. The process of claim 1 wherein said water-soluble base is sodium carbonate.

6. The process of claim 1 wherein said spent solution is diluted to a content of said alkali metal equal to from .5 to 1 equivalent per liter.

7. In a process for treating a spent neutralizing solution employed in a process for refining hydrocarbon distillates wherein a hydrocarbon distillate is contacted with sulfuric acid to form a sludge and a treated distillate containing small amounts of oil-soluble emulsifying material, said distillate is separated from said sludge, the separated distillate is contacted with an aqueous solution of a water-soluble base of an alkali metal containing at least two equivalents per liter of said alkali metal under conditions such that said emulsifying material is dissolved in the aqueous phase, and the contacted distillate and resulting spent neutralizing solution are separated from each other, the improvement comprising diluting said solution with water to a content of said alkali metal equal to from .25 to 2 equivalents per liter, emulsifying the dilute solution with a small volume of a middle oil, heating the resulting emulsion to a temperature above about 140° F. and below its boiling temperature, whereby the emulsifying material is changed into a compound insoluble in the aqueous phase and is transferred to said middle oil and the emulsion is broken, and separating the resulting oily and aqueous phases.

8. The process of claim 7 wherein said spent solution is diluted to a content of said alkali metal equal to from .5 to 1 equivalent per liter.

BRUCE W. DUNBAR.